United States Patent
Holtzworth et al.

(10) Patent No.: US 7,117,824 B2
(45) Date of Patent: Oct. 10, 2006

(54) PETBIB SMALL ANIMAL SHOULDER CARRIER AND TOY

(76) Inventors: Kathryn Ann Holtzworth, 43 Inspirational Dr., Sedona, AZ (US) 86336; Virginia Mae Sandlin, P.O. Box 308, Sedona, AZ (US) 86339

( * ) Notice: Subject to any disclaimer, the term of this patent is extended or adjusted under 35 U.S.C. 154(b) by 509 days.

(21) Appl. No.: 10/612,696

(22) Filed: Jul. 2, 2003

(65) Prior Publication Data

US 2006/0096550 A1 May 11, 2006

Related U.S. Application Data

(60) Provisional application No. 60/397,061, filed on Jul. 18, 2002.

(51) Int. Cl.
*A01K 1/03* (2006.01)
*A41B 13/10* (2006.01)

(52) U.S. Cl. .................. 119/850; 119/497; 2/49.1

(58) Field of Classification Search .............. 119/850, 119/537, 482, 496, 497; 2/49.1, 459, 461, 2/462, 102, 84, 103, 94, 95
See application file for complete search history.

(56) References Cited

U.S. PATENT DOCUMENTS

| | | | | |
|---|---|---|---|---|
| 2,499,689 A | * | 3/1950 | Sossamon | 2/48 |
| 2,717,391 A | * | 9/1955 | Bracken | 2/94 |
| 3,429,138 A | * | 2/1969 | Goldmerstein | 62/259.3 |
| 4,068,313 A | * | 1/1978 | Goldman | 2/49.1 |
| 4,369,526 A | * | 1/1983 | Clutts | 2/51 |
| 4,542,713 A | * | 9/1985 | Hansen | 119/417 |
| 4,710,979 A | * | 12/1987 | Bull et al. | 2/48 |
| 4,796,304 A | * | 1/1989 | Shelby | 2/94 |
| 4,924,528 A | * | 5/1990 | Trombetti-Dickens | 2/104 |
| 5,210,881 A | * | 5/1993 | Stocker et al. | 2/247 |
| 5,275,125 A | * | 1/1994 | Rotramel | 119/416 |
| 5,331,921 A | * | 7/1994 | vanVonno | 119/537 |
| 5,363,803 A | * | 11/1994 | Serro | 119/537 |
| 5,465,425 A | * | 11/1995 | Crispin | 2/102 |
| 5,611,084 A | * | 3/1997 | Garry et al. | 2/93 |
| 5,664,258 A | * | 9/1997 | Harris | 2/84 |
| 5,815,834 A | * | 10/1998 | Bronson | 2/102 |
| 5,829,056 A | * | 11/1998 | Hubert | 2/48 |
| 5,852,828 A | * | 12/1998 | Foster | 2/102 |
| 5,913,409 A | * | 6/1999 | Test | 2/102 |
| 6,049,914 A | * | 4/2000 | Heilman | 2/247 |
| 6,105,170 A | * | 8/2000 | Lisciandro et al. | 2/102 |
| 6,182,291 B1 | * | 2/2001 | Garvey | 2/102 |
| 6,209,134 B1 | * | 4/2001 | Schiesel | 2/102 |
| 6,233,737 B1 | * | 5/2001 | Ditchfield et al. | 2/2.5 |
| 6,442,759 B1 | * | 9/2002 | Straham et al. | 2/49.1 |
| 6,450,126 B1 | * | 9/2002 | Schellenbach | 119/537 |

(Continued)

*Primary Examiner*—Yvonne R. Abbott

(57) ABSTRACT

A garment for the transporting, observing, entertaining, training, and displaying of small animals, reptiles and insects (gerbils, mice, snakes, tarantulas, spiders, lizards, etc.) in the tunnels of the garment while on the shoulders of their owners. The garment consists of a see-through, mesh washable fabric panel on top and a brightly colored washable panel underneath, attached to each other using releasable fasteners. The fasteners also provide means to construct tunnel walls and nesting areas for the small animal. The fasteners further provide attachment to the garment tunnel's floor and walls for toys and other paraphernalia to entertain the pet and adorn the garment. This garment allows the owner to hold, observe, and transport his pet without damaging or soiling his clothes while his pet has a tunnel in which to play and rest safely. Also the owner can remove toys, food and nesting material in order to launder the garment.

1 Claim, 1 Drawing Sheet

U.S. PATENT DOCUMENTS

Figure 1:
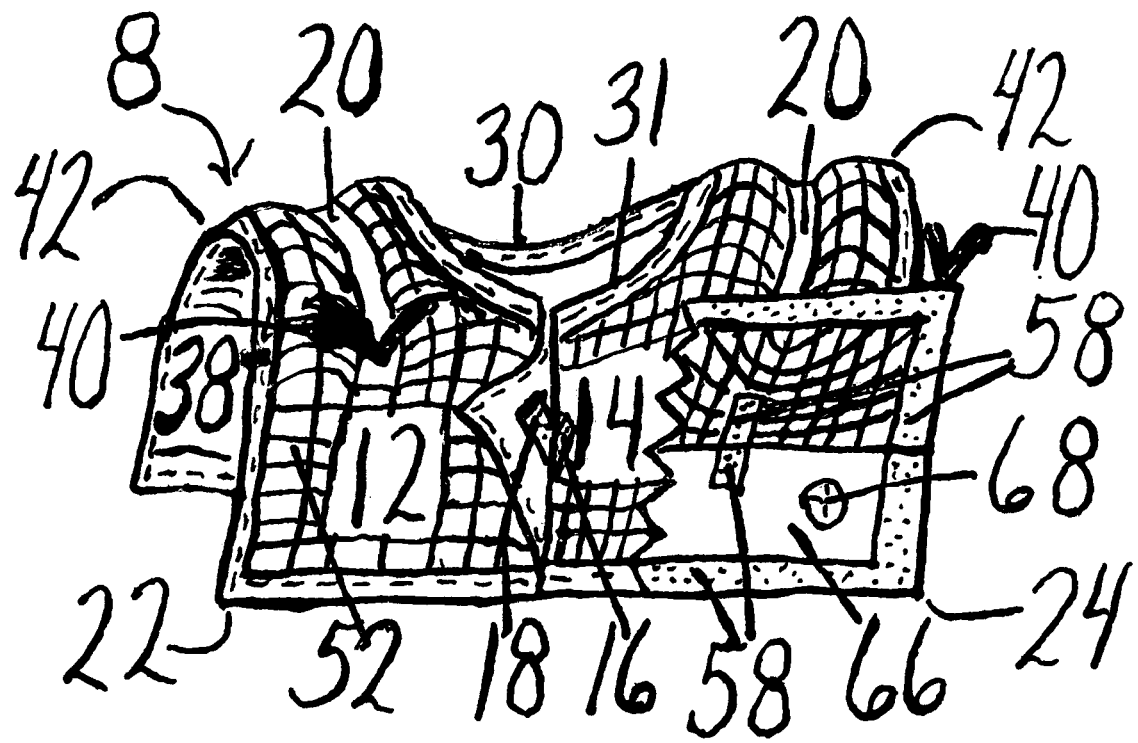

| | | | |
|---|---|---|---|
| 6,516,745 B1 * | 2/2003 | Spires et al. | 119/28.5 |
| 6,517,214 B1 * | 2/2003 | Mitchell et al. | 362/108 |
| 6,662,373 B1 * | 12/2003 | Frank | 2/94 |
| 6,684,422 B1 * | 2/2004 | LeFevre et al. | 5/496 |
| 6,874,163 B1 * | 4/2005 | Marshall | 2/102 |
| 7,013,493 B1 * | 3/2006 | Briscoe et al. | 2/247 |

* cited by examiner

PETBIB SMALL ANIMAL SHOULDER CARRIER AND TOY

CROSS REFERENCE TO RELATED APPLICATIONS

Applicant claims priority of Provisional Application No. 60/397,061, filed Jul. 18, 2002

STATEMENT REGARDING FEDERALLY SPONSORED RESEARCH AND DEVELOPMENT REFERENCE TO SEQUENCE LISTING, A TABLE, OR A COMPUTER PROGRAM LISTING APPENDIX

Not Applicable

REFERENCE TO SEQUENCE LISTING, A TABLE, OR A COMPUTER PROGRAM LISTING APPENDIX

Not Applicable

BACKGROUND OF THE INVENTION

The invention relates to a garment worn by the user for clothing protection and to transport and entertain small animals (gerbils, mice, snakes, tarantula, spiders, lizards, etc.). More specifically, this garment relates to a short, very colorful shoulder cover garment that is used to protect the clothing of the user and to display, shelter and observe the animal while providing entertainment and protection of the animal.

Individuals who have small animals (gerbils, mice, snakes, tarantulas, spiders, lizards, etc.) often relate to them closely and like to show them off and play with them out of their cages, often going so far as to put them in a pocket or bag for their protection. Around the shoulders is a natural place for these animals to climb onto for safety from larger animals and to get away from quick hand and body movements from people that scare the animals. Small animals also are attracted to bright colours due to their curious nature. When they are out of their cage, they like to crawl into covered places like tunnels to hide and rest. Often they climb inside a person's clothes, and sometimes fearfully bite or accidentally claw a person trying to put them back in their cage. Another problem arises when the animal relives itself, which is quite often if the animal is afraid or uncomfortable. The droppings of small animals are not excessively large and generally dry quickly without much noticeable odor, but it may stain or discolour clothing. It is not uncommon for a person to have to change clothing after handling small animals.

A number of shoulder drapes with perches for birds have been developed, most inclined to locate over ones shoulder with some form of waist collecting receptacle. Although these have been suitable for birds, they have no tunnelling effect for small animals such as gerbils, mice, lizards, tarantulas, etc., that need to be more sheltered and confined, both for the safety of the animal and its comfort as it is being transported. There are several devices for mazes and tunnels available to transport small animals and to provide tunnels and mazes: however, they are not made of flexible material, nor do they fit around the shoulders of the owner.

U.S. Pat. No. 5,054,427 of Hoover describes insertable stacking components which are transparent to view the animal and the configuration of the maze pieces can be changed for more entertainment of the animal. They are made of transparent, colored, molded plastic and are meant to be in an enclosure such as a cage: therefore they are not suitable for safe enclosure of the animal while it is being transported and the animal can't be placed on the owners body. U.S. Pat. No. 4,542,713 of Hansen makes available a kit for making your own maze, but the invention is designed for school project uses and is too cumbersome to be portable when completed.

U.S. Pat. No. 6,516,745 of Spires describes a pet travelling kit that resembles a folding garment bag. It provides a cushion for the pet and pockets for storing items the pet may need: however, it is designed for a cat or dog and would not be suitable for the smaller animals such as gerbils, mice, lizards, snakes, etc., because it is too big and it would be hard to find such a small animal to remove or check on during travel without the possibility of the animal slipping away.

U.S. Pat. No. 5,275,125 of Rotramel describes an animal harborage which is made primarily as a pest trap in which you can inject insecticides. Although it would be a suitable container for insects because it has artificial webs and is made of solid porous materials, it is designed as a cage in which the insects could hide, thus it would limit the best observation of the insect or rodent, and would not allow the close feeling an owner gets when the pet is placed on the shoulder.

U.S. Pat. No. 6,450,126 of Schellenbach describes a shoulder draped bird perch which transports birds on both shoulders of the owner and allows for adjustable fasteners, weighting of the material, attachment of toys and adjustable sizes. While it is quite adequate for all sizes of birds who are trained to stay on an owners shoulder, it does not have any tunnels for small animals which need to be confined while being observed, displayed, trained and transported.

There is such a pressing need in the field of garment design for new shoulder worn devices to provide a secure environment for owners to display, entertain and transport their small animals. This garment has been designed with unique features to show off, entertain, observe, and transport small animals along with protecting the wearer's clothing from being soiled by animal droppings.

BRIEF SUMMARY OF THE INVENTION

The above noted problems, and others, are over come by the small animal shoulder carrier garment of this invention, which basically covers the front and back shoulder areas of the wearer, opening at the front with any one of a number of conventional means. The releasable fasteners allow the adjustment of the tunnel configuration and for easy removal of the animals, making it possible to remove said animal from any point along the garment edges. The ties provide a means where by toys and other paraphernalia are attached to the garment. It is foreseen that some people will enjoy covering both the top layer and the bottom layer of the tunnels with toys, bells, mirrors and buttons along with any other items a small animal would play with in the tunnels or which they wish to display. These garments, as in all garments, will be made in varying sizes; small, medium and large.

While any suitable configuration for the garment may suffice, the preferred design will incorporate a top panel and bottom panel which are attached by releasable fasteners that provide a tunnel, an enclosed environment for the animal, the attachment of other toys in the tunnel and allow for the laundering of the garment. The top and bottom panels are attached to each other by the conventional method of sewing at the neck opening. The outer edges of the top and bottom panels will be attached to each other with, but not limited to, a hook-loop type of attachment to allow for easy laundering of the garment and easy removal of the animal. The rear of the garment will cover the area midway down the back, and outwardly just past the break in the shoulders with angles corners at the lower extremities. Two frontal panels, a left frontal panel and a right frontal panel, are extensions of the back panel, formed by the neck opening in the garment and are attached to each other with, but not limited to, a hook-loop type of attachment, and overlapping in the front, as in any shirt or blouse type of garment with, but not limited to, a hook-loop type of attachment with the hook-loop attachment slight adjustments may be made for the varying sizes of the wearer, while with buttons, snaps and other conventional means of attachment there are similar adjustment capabilities, but all will work for the closure of the two frontal panels of the unique garment as well as the outside edges, according to the type of animals being transported. These frontal panels will cover the upper chest area of the wearer from the apex of the shoulder to approximately ⅔ of the way down the chest, depending on the size of the wearer. The frontal panels will have an angled configuration matching those of the rear panel. The neck line of the garment may have any number of styles, V neck, square neck, or a curved neck line, giving a variety of styles while staying in the scope of the patent. the material for the bottom panel of the preferred embodiment would be, but not limited to, 100% cotton, where by it would be easily laundered, and available in a wide variety of bright and unique colors and patterns. This type of material would absorb the moisture and the bright colors would conceal some of the droppings. The droppings of small animals are often a white substance that when dry can be brushed off easily. A nonsliding material as in, but not limited to, a soft cotton flannel, will be used for the backing of the bottom panel to prevent slipping with the movement of the animal. The material for the top panel of the preferred embodiment would be, but not limited to, a see-through, mesh material such as fiberglass screening, fisherman's netting, etc., whereby the garment could be easily laundered, and available in a wide variety of mesh hole sizes for various sized animals, reptiles and insects. This type of material allows the animal to be easily observed, provide adequate air circulation and confine it while being transported or displayed. other with, but not limited to, a hook-loop type of attachment, and overlapping in the front, as in any shirt or blouse type of garment with, but not limited to, a hook-loop type of attachment with the hook-loop attachment slight adjustments may be made for the varying sizes of the wearer, while with buttons, snaps and other conventional means of attachment there are similar adjustment capabilities, but all will work for the closure of the two frontal panels of the unique garment as well as the outside edges, according to the type of animals being transported. These frontal panels will cover the upper chest area of the wearer from the apex of the shoulder to approximately ⅔ of the way down the chest, depending on the size of the wearer. The frontal panels will have an angled configuration matching those of the rear panel. The neck line of the garment may have any number of styles, V neck, square neck, or a curved neck line, giving a variety of styles while staying in the scope of the patent the material for the bottom panel of the preferred embodiment would be, but not limited to, 100% cotton, where by it would be easily laundered, and available in a wide variety of bright and unique colors and patterns. This type of material would absorb the moisture and the bright colors would conceal some of the droppings. The droppings of small animals are often a white substance that when dry can be brushed off easily. A nonsliding material as in, but not limited to, a soft cotton flannel, will be used for the backing of the bottom panel to prevent slipping with the movement of the animal. The material for the top panel of the preferred embodiment would be, but not limited to, a see-through, mesh material such as fiberglass screening, fisherman's netting, etc., whereby the garment could be easily laundered, and available in a wide variety of mesh hole sizes for various sized animals, reptiles and insects. This type of material allows the animal to be easily observed, provide adequate air circulation and confine it while being transported or displayed. The ties will be used to attach toys, and other paraphernalia for entertaining the animals and making the garment more fun to wear. The panels may be turned inside out and sewn in a conventional manner for assembly, or may be edges with a colorful bias tape, which is another conventional method for manufacturing garments. It must be noted that, like adding toys to the inside of an animals cage and adding pins to a funny hat, this garment is intended to be adorned in a number of ways by the wearer, but the adding of tunnels are included within the scope of this patent.

It is the object of this invention to create a garment whereby the wearer can transport varying sizes of small animals, reptiles and insects in a relatively natural environment.

It is also the object of the invention to create a device which protects the wearers clothing, both front and back, from damage from a small pet's droppings when transporting on the shoulder, or damage from the pet's teeth and claws.

It is another object of the invention to create a device which creates a tunnel enclosure and carrier garment for transporting, training, displaying and observing small animals, reptiles and insects.

It is still another object of this invention to create a garment that may be made of a wide variety of bright and colourful materials enhancing and showing off the color of the pet animals.

It is still another object of this invention to create a garment that may be made in varying sizes while being able to adjust within each size to make the garment fit comfortably to accommodate the movement of the animal.

It is yet another object of this invention to create a garment that can be easily adorned with toys and other paraphernalia inside the tunnels to entertain the animal and to enhance the garment. The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWING FIGURES

FIG. 1 is a frontal perspective view of the PetBib shoulder carrier garment device with a mesh see-through top panel and a bottom colorful panel joined together with releasable fasteners and ties. The cut-a-way in the right front panel shows the fasteners that create the tunnels and an example of the typical shiny gemlike toys and ornaments that are placed strategically throughout the tunnels created by the joining of the top and bottom panels.

Figure 2:
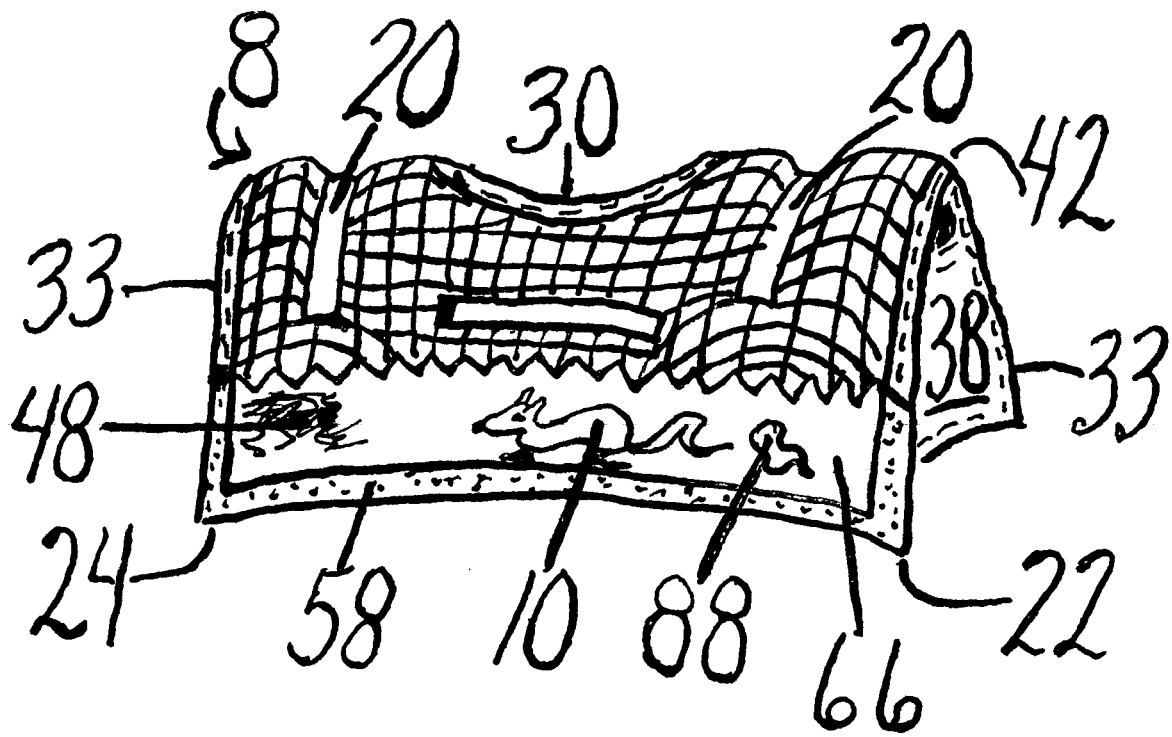

FIG. 2 is a rear perspective view of the PetBib shoulder carrier garment device with the mesh see-through top panel and the bottom colorful panel joined together with releasable fasteners and ties. The cut-a-way in the rear view shows a typical small animal in the tunnels with strategically placed typical nesting and the releasable fasteners, which create the tunnels.

DETAILED DESCRIPTION

FIG. 1 is a frontal perspective view of the PetBib shoulder carrier garment device 8 displaying a first panel depicted as a right frontal panel 12 and a second panel shown as the left frontal panel 14. The right frontal panel 12 is folded back displaying an optional means of attachment of the right frontal panel 12 to the left frontal panel 14 mating fasteners in the form of hook material 16 and loop material 18 attached to the garment device 8 by means of sewing, adhesive, or other conventional means of affixing of the fastener to the fabric of the garment device 8. Of course, the means of attachment of the first panel to the second could be conventional fasteners such as snaps, hooks and eyes, or ties, but the current best mode features hook and loop fabric.

The front neckline 31 of the garment device 8 will be available in a number of variations of style, V neck, a square neck, or curved neck, with a back neckline 30 retaining the conventional curved configuration. The lower extremities 22 and 24 of the frontal panels 12 and 14 in the current best mode have the angled configuration displayed in FIG. 1, but other shapes are anticipated.

The back panel 30 having the similar angled extremities 22 and 24 in the current best mode with the most stable mount extends approximately two-thirds of the way down the back of the wearer, depending on their size. Of course different owners may wish to have this extension down the back larger or smaller, and styles may dictate a change also, and such is anticipated.

The backing or inner surface 38 of the garment device 8 is currently best constructed of a soft flannel material; however, other materials could be used depending on the wearer's comfort concerns. The edges 33 of the garment device 8 are configured in any convention manner, one current mode being the turning of the garment device 8 inside-out and sewing th edges 33, or edging the garment device 8 with a conventional bias tape.

A typical pet small animal 10 resting on the bottom panel 66 in FIG. 2 has the high probability of placing droppings 88 displayed on the bottom panel 66 during the animal 10's daily tenure on the device 8. Since the device functions as a means for protection of the clothing of the user from such droppings, material resistant and from which the droppings may be easily removed is used for the bottom panel 66.

A toy 68 is shown attached on the bottom panel 66 on the tunnel floor in FIG. 1, although they may be attached to any of the tie straps 20 throughout the article. A means to entertain the animal 10 is thus provided by attachment of the toy 68 to the device 8 and the device 8 can be provided with a plurality of such toys 68 that are releaseably attachable to device 8 to enhance this means to entertain the animal 10.

Additional function is provided by a means to traverse through tunnels 52 on opposing shoulders of the user, without touching the user. This means to traverse between shoulders is provided by the tunnels 52 which allows the animal 10 to translate between the two shoulders 42 by travelling through the tunnels 52 as it goes from one side to the other. Of course other types of fabric or material can be used to form the tunnels 52 but the current best mode features see-through, mesh materials as they provide an excellent shelter construction for the animal 10 during traverse and to provide adequate air supply. This encourages the animal 10 to traverse between shoulders without touching the user's back, neck, or clothing, and to change positions, thus allowing the animal 10 more exercise as well as dispersing the animal's weight on the user to two shoulders over time. Nesting material 48 can be placed in tunnels 52 as shown in the cut-a-way of FIG. 2.

While all the fundamental characteristics and features of the PetBib shoulder carrier garment device 8 have been shown and described, it should be understood that various substitutions, modifications and variations may be made by those skilled in the art without departing from the spirit or scope of the invention. Consequently, all such modifications and variations are included within the scope of the invention as defined by the following claims.

What we claim as our invention is:

1. A body mountable small animal shoulder carrier and toy garment comprising:
    a top see-through, mesh fabric panel;
    a bottom brightly colored fabric panel communicating with said top panel at a neck opening and outer edges in order to construct tunnel walls within said garment so that a small animal, reptile, or insect can easily be observed, provide adequate circulation and confine it while it is being transported and displayed;
    a means of releasable attachment of said top panel to bottom panel to close a gap therebetween, wherein said means of releasable attachment comprises one of snaps and hook-loop attachment;
    said neck opening defined by the area in the center of the garment, creating a left front panel and right front panel to the garment;
    and wherein said means of releasable attachment provides a means of lateral translation of said left front panel in relation to said right front panel, whereby said neck opening may be adjusted for size by adjustment of said means of lateral translation of said left front panel in relation to said right front panel; wherein releasable attachment of said top panel and said bottom panel forms tunnels within the garment cavity; and a selectable small animal toy from a group of releasably attachable animal toys, said selectable animal toy releasably attachable to tunnel's floor and walls of said garment;
    and means to releasably attach said selectable animal toy to said garment within the tunnel's floor and walls of said garment.

\* \* \* \* \*